(12) United States Patent
Holm et al.

(10) Patent No.: US 10,694,722 B1
(45) Date of Patent: Jun. 30, 2020

(54) SYSTEMS AND METHODS OF INTENSIVE RECIRCULATING AQUACULTURE

(71) Applicant: Atlantic Sapphire IP, L.L.C., Miami, FL (US)

(72) Inventors: Thue Holm, Vejle (DK); Johan E. Andreassen, Miami, FL (US)

(73) Assignee: Atlantic Sapphire IP, L.L.C., Miami, FL (US)

( * ) Notice: Subject to any disclaimer, the term of this patent is extended or adjusted under 35 U.S.C. 154(b) by 312 days.

(21) Appl. No.: 15/157,296

(22) Filed: May 17, 2016

Related U.S. Application Data

(60) Provisional application No. 62/165,144, filed on May 21, 2015.

(51) Int. Cl.
*A01K 63/04* (2006.01)
*C02F 3/30* (2006.01)
(Continued)

(52) U.S. Cl.
CPC .......... *A01K 63/045* (2013.01); *A01K 63/006* (2013.01); *A01K 63/042* (2013.01); *A01K 63/047* (2013.01); *B01D 21/01* (2013.01); *B01D 21/2455* (2013.01); *C02F 1/001* (2013.01); *C02F 1/325* (2013.01); *C02F 1/66* (2013.01); *C02F 3/04* (2013.01); *C02F 3/085* (2013.01); *C02F 3/305* (2013.01); *C02F 9/00* (2013.01); *C02F 11/14* (2013.01); *C02F 2101/105* (2013.01); *C02F 2101/16* (2013.01); *C02F 2103/20* (2013.01); *C02F 2209/02* (2013.01);
(Continued)

(58) Field of Classification Search
CPC .... A01K 63/00; A01K 63/003; A01K 63/006; A01K 63/04; A01K 63/042; A01K 63/045; A01K 63/047; B01D 21/01; B01D 21/2455
USPC ................................................. 119/226, 227
See application file for complete search history.

(56) References Cited

U.S. PATENT DOCUMENTS 3,200,949 A * 8/1965 Aulich ................... B01D 21/01
                                                        209/5
4,052,960 A * 10/1977 Birkbeck ............... A01K 61/00
                                                        119/227

(Continued)

FOREIGN PATENT DOCUMENTS

CN    102329055 A    1/2012
JP    H01112935 A    5/1989
(Continued)

OTHER PUBLICATIONS

Van Der Heile, Tony et al. "Composition, Treatment and Use of Saline Groundwater for Aquaculture in the Netherlands," World Aquaculture, Jun. 2014, pp. 23-27.
(Continued)

*Primary Examiner* — Tien Q Dinh
*Assistant Examiner* — Brady W Frazier
(74) *Attorney, Agent, or Firm* — Malloy & Malloy, P.L.

(57) ABSTRACT

Systems and methods for intensive recirculating aquaculture are provided herein. An example system includes water sourced from a first segment of a saline aquifer, a recirculating aquaculture system receiving the sourced water and producing discharge water, and a water discharge point located within second segment of the saline aquifer disposed below the first segment of the saline aquifer.

20 Claims, 9 Drawing Sheets

(51) Int. Cl.

| | | |
|---|---|---|
| C02F 1/32 | (2006.01) | |
| C02F 9/00 | (2006.01) | |
| C02F 1/66 | (2006.01) | |
| C02F 1/00 | (2006.01) | |
| B01D 21/01 | (2006.01) | |
| B01D 21/24 | (2006.01) | |
| C02F 3/08 | (2006.01) | |
| A01K 63/00 | (2017.01) | |
| C02F 103/20 | (2006.01) | |
| C02F 101/16 | (2006.01) | |
| C02F 11/14 | (2019.01) | |
| C02F 3/04 | (2006.01) | |
| C02F 101/10 | (2006.01) | |

(52) U.S. Cl.
CPC ...... C02F 2209/03 (2013.01); C02F 2209/05 (2013.01); C02F 2209/06 (2013.01); C02F 2209/22 (2013.01); C02F 2209/42 (2013.01); C02F 2303/04 (2013.01)

(56) References Cited

U.S. PATENT DOCUMENTS

| | | | | |
|---|---|---|---|---|
| 4,067,809 | A * | 1/1978 | Kato | A01K 63/045 119/227 |
| 4,728,438 | A * | 3/1988 | Featherstone | B01D 36/04 210/713 |
| 4,966,096 | A | 10/1990 | Adey | |
| 5,317,645 | A | 5/1994 | Perozek et al. | |
| 5,659,977 | A | 8/1997 | Jensen et al. | |
| 5,732,654 | A * | 3/1998 | Perez | A01K 63/04 119/204 |
| 5,961,831 | A * | 10/1999 | Lee | A01K 63/042 119/204 |
| 5,978,315 | A | 11/1999 | Molaug | |
| 6,041,738 | A * | 3/2000 | Hemauer | A01K 63/042 119/226 |
| 6,206,612 | B1 * | 3/2001 | Meyer | A01C 3/02 137/236.1 |
| 6,317,385 | B1 | 11/2001 | Hedgepeth | |
| 6,382,134 | B1 * | 5/2002 | Gruenberg | A01K 63/04 119/215 |
| 6,443,098 | B1 | 9/2002 | Blyth et al. | |
| 6,447,681 | B1 * | 9/2002 | Carlberg | A01K 63/04 119/227 |
| 6,474,264 | B1 * | 11/2002 | Grimberg | A01K 63/04 119/215 |
| 6,499,431 | B1 * | 12/2002 | Lin | A01K 61/00 119/226 |
| 6,722,314 | B1 * | 4/2004 | Crisinel | A01K 63/042 119/200 |
| 6,986,323 | B2 | 1/2006 | Ayers | |
| 7,001,519 | B2 | 2/2006 | Linden et al. | |
| 7,082,893 | B2 | 8/2006 | Schreier et al. | |
| 7,462,284 | B2 * | 12/2008 | Schreier | A01K 63/04 119/227 |
| 8,117,992 | B2 * | 2/2012 | Parsons | A01K 61/10 119/227 |
| 8,141,515 | B2 * | 3/2012 | Nien | A01K 63/04 119/226 |
| 8,633,011 | B2 | 1/2014 | Palmer et al. | |
| 9,637,402 | B2 * | 5/2017 | Tal | C02F 3/2806 |
| 9,756,838 | B2 * | 9/2017 | Kunitomo | A01K 63/04 |
| 10,034,461 | B2 | 7/2018 | Holm et al. | |
| 2003/0070624 | A1 | 4/2003 | Zohar | |
| 2004/0168648 | A1 * | 9/2004 | Ayers | A01K 61/00 119/200 |
| 2004/0244715 | A1 * | 12/2004 | Schreier | A01K 63/045 119/259 |
| 2005/0211644 | A1 | 9/2005 | Goldman | |
| 2007/0221552 | A1 * | 9/2007 | Denney | B01D 21/0093 210/85 |
| 2008/0000821 | A1 | 1/2008 | Drewelow | |
| 2008/0223788 | A1 | 9/2008 | Rimdzius et al. | |
| 2009/0145368 | A1 | 6/2009 | Brauman | |
| 2010/0236137 | A1 | 9/2010 | Wu et al. | |
| 2010/0269761 | A1 | 10/2010 | Nien | |
| 2011/0258915 | A1 | 10/2011 | Subhadra | |
| 2012/0184001 | A1 * | 7/2012 | Stephen | A01K 61/60 435/134 |
| 2013/0098303 | A1 * | 4/2013 | Jones | A01G 31/00 119/215 |
| 2013/0319342 | A1 * | 12/2013 | Musser | A01K 63/045 119/227 |
| 2013/0327709 | A1 | 12/2013 | Stroot | |
| 2014/0261213 | A1 * | 9/2014 | Stiles, Jr. | A01K 63/047 119/245 |
| 2015/0230439 | A1 * | 8/2015 | Harwood | A01K 63/045 119/227 |
| 2015/0342161 | A1 * | 12/2015 | Sheriff | A01K 63/045 119/227 |
| 2015/0366173 | A1 | 12/2015 | Myers | |
| 2018/0125041 | A1 | 5/2018 | Holm et al. | |
| 2019/0169046 | A1 | 6/2019 | Holm | |
| 2019/0200584 | A1 | 7/2019 | Holm | |

FOREIGN PATENT DOCUMENTS

| | | |
|---|---|---|
| WO | WO2002041703 A2 | 5/2002 |
| WO | WO2017002081 A1 | 1/2017 |
| WO | WO2017153986 A1 | 9/2017 |

OTHER PUBLICATIONS

Storrø, Gaute, "Investigations of salt groundwater at Akvaforsk Research Institute, Sunndalsøra, Norway," Geological Survey of Norway, NGU-rapport 93.029, 1993, 11 pages.

Small, Brian et al. "On the Feasibility of Establishing a Saline Aquaculture Industry in Illinois," Illinois Sustainable Technology Center [online], <URL:http://www.istc.illinois.edu/info/library_docs/TR/TR051.pdf>, Mar. 2014, 46 pages.

Sharrer, Mark J. et al., "Evaluation of geotextile filtration applying coagulant and flocculant amendments for aquaculture biosolids dewatering and phosphorus removal", Aquacultural Engineering, vol. 40, Issue 1, Jan. 2009, 10 pages, <URL:https://www.sciencedirect.com/science/article/pii/S0144860908000678> (Accessed Dec. 4, 2017).

"Recirculation Systems", AKVA Group, 6 pages, <URL:http://www.akvagroup.com/products/land-based-aquaculture/recirculation-systems> (Accessed Dec. 4, 2017).

"Water Source", University of Alaska, Fairbanks, School of Fisheries & Ocean Sciences, 53 pages, <URL:https://www.sfos.uaf.edu/fitc/teaching/courses/fish336/materials/FISH%20336%20Lect%2031%20Water%20Quality%203.pdf> 'Accessed Dec. 4, 2017).

Sun, Min et al., "Models for estimating feed intake in aquaculture: A review", Abstract, Computers and Electronics in Agriculture, vol. 127, Sep. 2016 <URL:http://www.sciencedirect.com/science/article/pii/S0168169916304240> (Accessed Dec. 4, 2017), 4 pages.

Milchman, Jon, "Construction/Clearance Permit Application", Florida Department of Environmental Protection ("FDEP"), May 12, 2013, 5 pages.

Haberfeld, Joseph, "Letter RE: First Request for Additional Information (RAI)", Florida Department of Environmental Protection, Jun. 4, 2013, 6 pages.

"Notice of Permit", Florida Department of Environmental Protection, Nov. 4, 2013, 18 pages.

"Notice of Draft Permit", South Dade News Leader, Homestead, Miami Dade County, Florida, Sep. 13, 2013, 1 page.

"Notice of Intent", South Dade News Leader, Homestead, Miami Dade County, Florida, Oct. 18, 2013, 1 page.

"State of Florida Well Completion Report", Feb. 2015, 23 pages.

Gorman, J. L et al., "Economic Feasibility of Utilizing West Alabama Saline Groundwater to Produce Florida Pompano and Hybrid Striped Bass in a Recirculating Aquaculture System", Alabama Agricultural Experiment Station, Auburn University, Dec. 2009, 19 pages.

(56) References Cited

OTHER PUBLICATIONS

Howard, Mark R., "Down the Drain", Florida Trend, Jan. 1, 2000, http://www.floridatrend.com/print/article/13274, 2 pages.

García-Bengochea, José I. et al., "Deep Well Disposal of Waste Waters in Saline Aquifers of South Florida", Abstract, American Geophysical Union Water Resources Research, vol. 6, Issue 5, Oct. 1970, 1 page.

\* cited by examiner

SYSTEMS AND METHODS OF INTENSIVE RECIRCULATING AQUACULTURE

CROSS REFERENCE TO RELATED APPLICATIONS

This Non-Provisional U.S. Application claims the benefit and priority of U.S. Provisional Application No. 62/165,144, titled "Systems and Methods of Intensive Recirculating Aquaculture", filed on May 21, 2015, which is hereby incorporated by reference herein in its entirety, including all references and appendices cited therein.

FIELD OF TECHNOLOGY

The present disclosure is generally directed to aquaculture systems and methods, and more particularly, but not by limitation to intensive recirculating aquaculture systems and methods using water sourced from specific locations within a saline aquifer.

SUMMARY

According to some embodiments, the present disclosure is directed to a recirculating aquaculture system comprising: (a) water sourced from a first portion of a saline aquifer; (b) a recirculating aquaculture system receiving the sourced water and producing discharge water; and (c) a water discharge apparatus that disposes of the discharge water into a second segment of the saline aquifer, the second portion of the saline aquifer being a predetermined distance below the first portion and below a ground surface.

An example recirculating aquaculture system can further comprise: (a) a tank for containing water and fish, the fish producing biological waste; (b) a mechanical filter that receives the water and biological waste through gravity feeding, the mechanical filter removing solid portions of the biological waste; (c) a first reservoir comprising: (i) a fixed bed biological filter that receives the mechanically filtered water and introduces lime into the water to regulate a pH level of the water through centrifugation, convert organic matter into carbon dioxide, and ammonia into nitrogen; and (ii) a moving bed biological filter that receives the water from the fixed bed biological filter through gravity feeding; (d) a degasser that receives the water from the fixed bed biological filter and removes the carbon dioxide and nitrogen from the water; and (e) a second reservoir that regulates a temperature of the water, wherein a first portion of the temperature regulated water is re-introduced into the tank and a second portion of the temperature regulated water is diverted to an oxygenation system.

According to some embodiments, the present disclosure is directed to method for raising fish in a recirculating aquaculture system, the method comprising: (a) circulating water from a water source in a tank of a recirculating aquaculture system, the recirculating aquaculture system; (b) introducing fish into the tank, the fish producing biological waste in the water; (c) removing the water and biological waste from an outlet of the tank; (d) passing the water with biological waste through a mechanical filter to remove solid portions of the biological waste, the mechanical filter in fluid communication with the outlet of the tank; (e) passing the water with biological waste through a biological filter to convert organic matter of the biological waste to create carbon dioxide, and ammonia of the biological waste to create nitrogen; (f) oxygenating the water; and (g) re-introducing the water into the tank at an inlet.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1A:
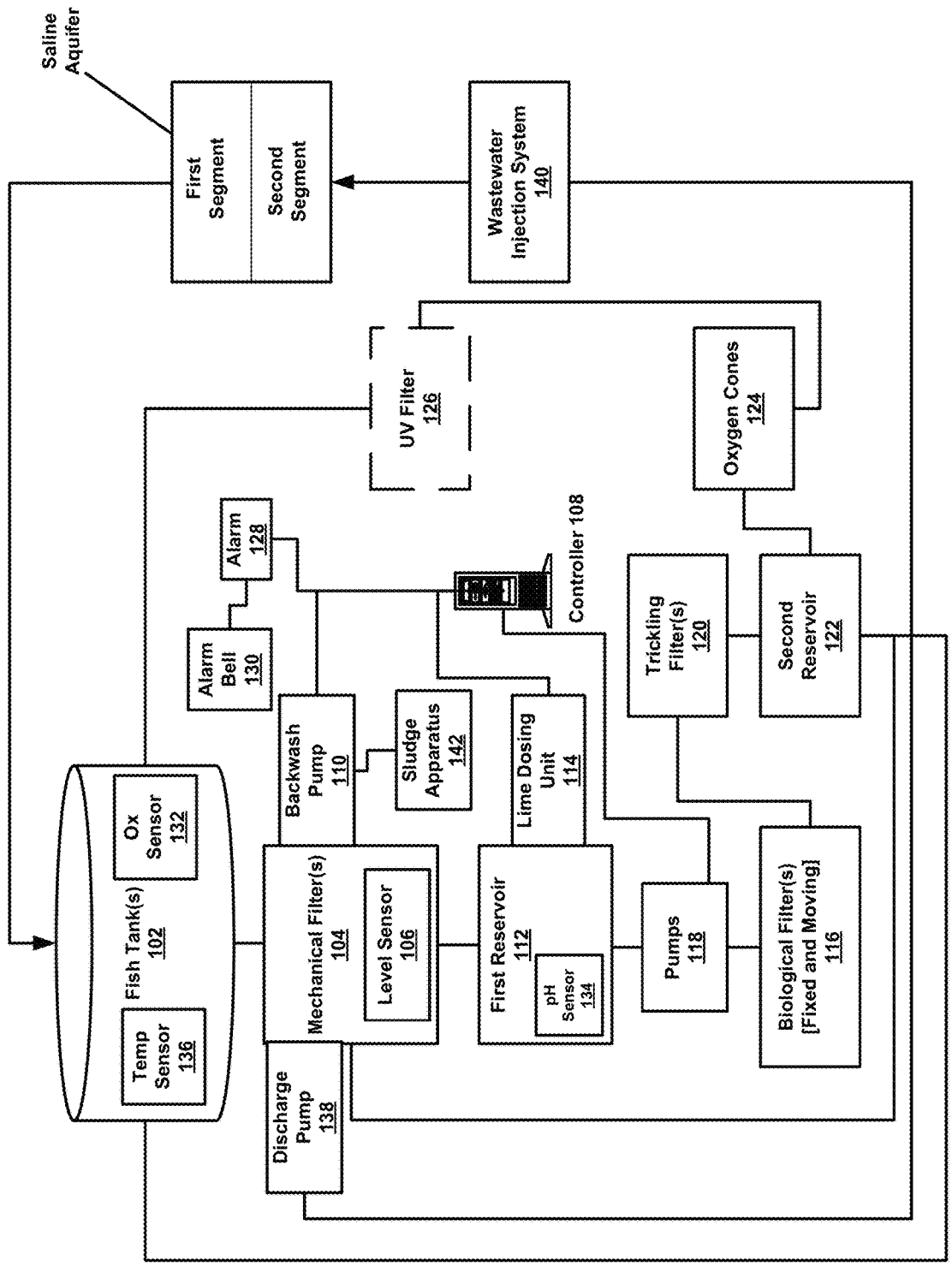
FIG. 1A is a schematic view of an example system, constructed in accordance with the present disclosure.

The present disclosure is directed to intensive recirculating aquaculture systems (RAS) and methods. One example of the recirculating aquaculture system comprises a tank that receives sourced water and at least one species of fish, such as salmon. The tank is in fluid communication with water recirculation apparatuses that process waste products introduced into the sourced water by the presence of the fish. Processing of the water can include any combination of cleaning, filtering, and oxygenating the sourced water. This processed water is recirculated into the tank. These systems and methods effectively reduce an amount of new water that is placed into the recirculating aquaculture system due to losses created from cleaning the recirculation apparatuses, evaporation, and other operational reasons. The water removed from the recirculating aquaculture system is referred to generally as sludge water or discharge water. The sludge water is created, for example, during back flushing of filters and other parts of the recirculation apparatuses.

In some embodiments, the water sourced from the recirculating aquaculture system is obtained from segments of underground aquifers. An example segment can have a salinity of five parts per thousand. Discharge water produced through use of the recirculating aquaculture system can be injected into lower portions of the aquifer positioned below a segment of the aquifer from which water is obtained for the RAS. By way of non-limiting example, the water can be sourced from a Floridan aquifer. In one example, water can be taken from a lower confining unit segment (LC) and a lower Floridan producing zone segment (LF1) of a Floridan aquifer. While the Floridan aquifer has been contemplated as an example saline aquifer the present disclosure can be applied to other saline aquifers. Moreover, the systems and methods of the present disclosure can be applied to freshwater aquifers as well, although the RAS system can include means for increasing the saline volume in the freshwater can be utilized. Additionally, if the saline content of the water obtained from a saline aquifer is above a pre-determined level, such as 40 ppt (such as brackish water), the RAS can implement a means for reducing the salinity of the water.

In one embodiment, the first segment includes any segment of the aquifer that comprises water with a salinity of approximately 5 to 30 ppt used in the rearing system. The second segment includes any segment or zone that is isolated from the zone from which source water is obtained.

In one embodiment, sludge water and/or discharge water created by the recirculating aquaculture system are pumped back into the Floridan aquifer at a water discharge point located within a boulder zone (BZ) segment of the Floridan aquifer.

According to various embodiments of the present disclosure, 300 to 600 liters of water are consumed per every kilogram of feed delivered to the recirculating aquaculture systems described herein. At a maximum feeding schedule, only 0.2% of a total water volume is exchanged each day.

For context, recirculating aquaculture systems of the present disclosure make it possible to culture fish under fully controlled conditions anywhere in the world. The technology is based on recirculation of water in a fish farming system installed onshore, whereby the same water is used over and over again in a nearly-closed circuit, thus minimizing the amount of new water added to the system.

The benefits of a closed fish farming system are many, such as the ability to regulate and control an internal environment to match a cultured species, an ability to reduce invasive fish diseases from surroundings, and control of temperature, salinity, oxygen and pH to meet requirements of the cultured species and also to meet the requirements at the different growth stages, such as inducing spawning, weaning fish larvae, or growing fish to market or restocking sizes.

It will be understood that recycling is a process whereby water quality is controlled by a water treatment system, not by inlet water into the water treatment system. The degree of recirculation may be expressed in various manners. In one example, the degree of reuse is expressed as a percentage, which is defined as a composition new or additional water added into the recirculating aquaculture system in relation to current water volume in the system. This value can fall within a range of approximately 95 to 99.9%, inclusive. The degree of reuse may be expressed in the following equation:

$$\text{Degree of reuse} = \frac{\text{Water flow to tanks}}{\text{Make up water} + \text{Water flow to tanks}} \times 100.$$

In another method, an amount of new water exchanged relates to an amount of feed that is fed to the fish per day. This is a more precise and unequivocal way of describing the degree of recirculation and is expressed in equation below:

$$\text{Water exchange per kg feed} = \frac{\text{water exchange/day (m}^3\text{/day)}}{\text{Feeding/day (kg/day)}}.$$

In some embodiments, moderate or semi intensive recycling is based on mechanical and biological filtration of water exiting fish tanks in order to remove waste products excreted by the fish. In general, the mechanical filter removes the solid particles, whereas the biological filters remove the dissolved compounds such as organic matter and transforms the toxic ammonia into the less toxic nitrate (nitrification) which is then diluted out of the system by newly added water.

As the water is re-introduced back to the fish tanks, aeration and oxygenation is taking place, in some embodiments. Some embodiments utilize disinfection by use of ultra-violet light (UV-filtration) prior to re-introduction of the water into the fish tanks. The exchange of water per day in such systems is normally 400-600 liter of new water per kg of feed applied to the system.

Full intensive recirculation, as described herein, can utilize denitrification filtering and phosphor removal systems. In the denitrification filter nitrate is transferred into free nitrogen. Using denitrification it is possible to reach recycling levels less than 0.1% of new water, which equals 50 to 100 liter of new water per kg of feed applied to the system. This means that water leaving the system can potentially be reduced to the water content in sludge that comes from the mechanical and biological filters plus what leaves through evaporation. As described herein, sludge water is produced through cleaning of various mechanical and biological filters utilized in the recirculating aquaculture systems.

The water sourced for use in recirculating aquaculture systems can have an impact on the processes required to convert the sourced water into water that is acceptable for fish rearing. For example, water sourced from local water supplies can comprise undesirable contaminates such as chlorine, chloramine, fluoride, and countless contaminates not filtered out by current water treatment processes such as pharmaceutical compounds, bacterium, spores, and so forth. These contaminates deleteriously affect the RAS systems and the fish raised therein.

The systems of the present disclosure can include recirculating aquaculture systems produced by Billund Aquakulturservice A/S. These systems can be utilized in accordance with the present disclosure.

The components are described in the order the water flows starting at the fish tanks. The water flow has several functions in a RAS such as removal of waste products and uneaten feed pellets from fish tanks, transportation of waste products and uneaten feed pellet to a drum filter (e.g., mechanical filtration) and the biological filters, and transportation of oxygen to the fish and the biological filter.

FIG. 1A illustrates an example illustration process showing a principal flow pattern in an example RAS, in schematic format. Generally, water is circulated in one or more fish tanks 102, which produces waste water. From a water flow perspective tank models can be divided in two main groups: round tanks and raceway tanks. Theoretical round tanks have the best self-cleaning capability because the circular flow pattern creates an ingoing transport of particles. Square tanks with round corners almost have the same feature but in relation to round tank these tanks can save up to 20% in building area.

A fish tank includes an outlet and inlet which are designed to ensure fast removal of excrements, uneaten feed pellets, so as to create optimal conditions for the fish. It is recommended that a bottom of the tank has a slope of approximately two to five percent, which facilitates emptying of the tanks. Tank material is economical, comprises a smooth surface, resiliency and durability during use, and does not exude chemicals into the water.

From the fish tanks 102, water runs by gravity feed into mechanical filter(s) 104. In the mechanical filter(s) 104, particles such as excrements and uneaten feed pellets are removed from the water. Effective removal of particles has an important influence for the fish health and the stability of the biological filter. High level of particles in the water can generate stress for the fish and thereby increase the risk of diseases, regarding the biological filters it can lead to increase in oxygen consumption and reduce the ability of nitrification in the biological filter.

Mechanical filtering of the water is accomplished, in some embodiments, by the use of drum filters. An example drum filter includes a Hydrotech™ drum filter produced by Water Management Technologies, Inc. In some cases disc filters are used. Depending on fish species and fish size, mesh sizes of the filter cloth are in the range from 40 to 90 μm.

A level sensor 106 inside the drum filter registers when the filter cloth is starting to clog and the water level rises. The level sensor 106 transmits signals to a controller 108 of the RAS to activate the drum filter to rotate. A backwash pump 110 starts backwashing the filter cloth as well. Separated solids are rinsed off the filter cloth into the solids collection trough and then discharged, as will be described in greater detail below. Again, the process of washing solids from the filters creates sludge waste that can be removed from the RAS. The backwash pump 110 is connected to a sludge apparatus 142 that can be used to remove sludge waste from the RAS.

It is important to check the spray nozzles on the spray bar regularly for clogging to insure optimal cleaning of the filter cloth. If this is not done the efficiency of the drum filter falls and causes higher volumes of sludge water. The backwash pump HO can deliver a pressure of eight bars to rinse the filter cloth, in some embodiments. In case of maintenance or reparation it is possible to bypass the water flow around the filters.

After water flow has passed the drum filter (also referenced as mechanical filter(s) 104), it travels by gravity feed to a first reservoir 112. If required, additional water is added into the water flow in the first reservoir. Lime dosing is done in the first reservoir 112 through a lime dosing unit 114 to regulate a pH level of the water flow. The first reservoir 112 is sized so as to provide a stabilizing effect on the water level in the RAS. The size of the first reservoir 112 can depend on design requirements.

In some embodiment, the water is pumped to biological filters 116. Centrifugal pumps 118 are utilized in some embodiments. The centrifugal pumps are installed in a dry sump pump from where they lift the water to fixed bed biological filters 116. In one embodiment, each bio-filter has one pump delivering water to it. In case of water entering the dry sump pump a submersible pump is installed to avoid flooding of the centrifugal pumps 118.

The water is pumped through the fixed bed biological filter 116 which includes three to five chambers depending on the size of the flow. The chambers are designed as submerged filters which mean that the bio media is covered with water at all time. In the biological filters, organic matter in the water flow is converted to carbon dioxide ($CO_2$) and the ammonia is converted to nitrate.

An amount of bacteria in the biological filter is associated with the rinsing capacity of the filter. Therefore, the bio media may comprise a large surface/volume ratio which produces optimal contact surface between the water and the bacterial bio film. The bio media used can be sourced from RK Bioelement™ media, manufactured by RK-Plast A/S, which in dry conditions has a specific surface/volume ratio of approximately 600 $m^2/m^3$.

Fixed bed filters are also configured to trap fine particles in the bio film and produces very clear water (e.g., with small amount of particles in the water).

An amount of water that is pumped through the fixed bed filter depends on the size of the RAS and the water flow in volumetric measurement. In smaller systems the total water flow is pumped through the filter but in larger systems movement of the water flow volume is facilitated by pumping to a trickling filter(s) 120. In some embodiments, the water flow communicates through gravity feed from the fixed bed filter to a moving bed biological filter.

The water flow runs through the moving bed filter by gravity, the filter comprises one to two chambers again depending on size of system and water flow volume/characteristics. The moving bed filter has the same function as the fixed bed filter, inasmuch as it converts organic matter to carbon dioxide and ammonia to nitrate.

In the moving bed filter aeration keeps the bio media in constant motion. The bio-media used is the same as in the fixed bed, in some embodiments. Aeration is accomplished with a blower, and valves make it possible to control and regulate aeration of the water within the fixed bed filter.

The bio film used in the fixed bed filter is self-cleaning due to aeration and therefore cleaning of the filter is unnecessary. A volume of water flow entering the moving bed filter is the same as the volume water flow entering the fixed bed. The water flow leaves the moving bed filter by gravity and runs to the trickling filter(s) 120.

From the moving bed filter the water flow is led to the top of the trickling filter(s) 120, also referred to here as a degassifier. In the trickling filter(s) 120, undesired gasses in the water such as carbon dioxide ($CO_2$) and nitrogen ($N_2$) are degassed and at the same time the water flow is oxygenated to approximately 100% saturation. In addition, organic matter in the water flow is converted to carbon dioxide ($CO_2$) and the ammonia converted to nitrate.

An example media used is the BIO-BLOK® (manufactured by BioBlok Solutions AS) with a specific surface of 200 $m^2/m^3$. Trickling filter ventilators are installed to ensure the correct air/water flow ratio in some embodiments.

The water flow is distributed on top of the trickling filter(s) 120, over the BIO-BLOK® either by a perforated plate or distribution pipes. The plates/pipes insure that the water is distributed evenly over the trickling filter(s) 120. A good distribution across the trickling filter(s) 120 insures an optimal oxygenation and degassing of $N_2$ and $CO_2$.

Depending on a size of the RAS system and its flow, all of or only a part of the water flow entering the trickling filter(s) 120 comes from the moving bed filter. If only a part of water flow comes from the filter the rest is pumped directly from the first reservoir as mentioned earlier.

From the trickling filter(s) 120 the water runs by gravity feed to a second reservoir 122 located under the trickling filter(s) 120.

The water flow is distributed on top of the trickling filter, over the BIO-BLOK® either by a perforated plate or distribution pipes. The plates/pipes ensure that the water is distributed evenly over the trickling filter. A good distribution across the trickling filters insures an optimal oxygenation and degassing of N2 and C02.

An example RAS of the present disclosure comprises a second reservoir which provides temperature regulation of the water flow, and also provides a stabilizing effect on the water flow.

In relation to the daily operation of the system it is important that the system is flexible and all components are easily accessible for ease of maintenance. As mentioned above, the RAS includes bypass mechanisms that would be known to one of ordinary skill in the art so as to allow for continued circulation of water flow during maintenance of the first and/or second reservoirs.

In some embodiments, a part of the water flow from the second reservoir is communicated back to the fish tanks by gravity feed. Another portion of the water flow is pumped through oxygen cones 124 before entering the fish tanks. The amount of oxygen added to the water is based upon the oxygen demand of the fish in the tanks. To be sure, oxygenation is not required for all embodiments, but is based on the biological characteristics of the fish. Stated otherwise, need for additional oxygen in the fish tank depends on any of the biomass, the size of the fish, feeding rate, the water temperature, salinity and the pressure of the water where the oxygen is added.

As mentioned above, water which has passed the trickling filter(s) 120 has 100% oxygen saturation. In some instances, in order to fulfil the demand for oxygen in the fish tanks, pure oxygen is added to the water flow by use of oxygen cones.

Some embodiments of an RAS include disinfecting and/or sterilizing apparatuses. For example, a UV filter exposes the water flow to UV radiation, and thereby disinfects the water flow before introduction and/or re-introduction into the fish tanks. The UV filter 126 can be positioned two different places in the RAS; after the oxygen cones or between the fixed bed biological filter and moving bed biological filter. Different UV filter models are used depending location. If the UV apparatus is placed after the oxygen cones an in-line UV apparatus is used. If the UV apparatus is placed between the fixed and moving biological filters a channel UV is used.

In some embodiments, approximately 30-40% of the total water flow in the system is treated with a UV dose equal to approximately 30 mWs/cm$^2$. The water passes the UV filter either by gravity or pressure (pumped).

In some embodiments, the RAS comprises a central PLC or controller 108, but all equipment can be run in manual operation if necessary. Selected parameters are monitored by the controller 108 and regulated in order to insure a stable and efficient system. Regulated and alarm-based parameters include, but are not limited to, oxygen, pH level, temperature, carbon dioxide, salinity, water levels, pump stops, water pressure, thermal failure, hour meter on pumps, running status (man./auto/or turned off), alarm history, and any combinations and permutations thereof are recorded.

In some embodiments, parameters can be constantly monitored such as low oxygen, high oxygen, pump stops, pumps status of the troughs, pump status of the trickling filter, low water level, high water level, low temperature, high temperature, low pH, high pH, and thermal failure, as well as any combinations thereof.

Parameters that are visible in the monitoring system oxygen, pH, temperature, hour meter on pumps and running status may be manually or automatically turned off, on/off time on the pump that pumps water out of the RAS, and alarm history.

Each of these parameters described above will be associated with optimal operating ranges.

If any of the parameters is out of its given operating range, an alarm 128 can be activated that activates on an alarm bell 130. The controller 108 can also transmit an SMS message to RAS operating personal in charge of the facility.

Each fish tank can comprise an oxygen sensor 132 that controls the addition of oxygen. These sensors provide signals to the controller, which in turn activates solenoid valves of an oxygen system, adding oxygen through oxygen flow meters. In some embodiments, the oxygen level in the fish tanks is constantly monitored and in case of lethal levels (high or low) an alarm will be activated and the emergency oxygen diffusers will turn on. The emergency diffusers are placed on the bottom of the fish tanks. The emergency oxygen system automatically turns on if the following situations appear such as power failure, pump failure, and/or low oxygen concentration in tanks. It is important to test and regulate the emergency system frequently to insure it works optimally.

The RAS also comprises a pH control system. In one embodiment, the pH control system is controlled using several non-limiting parameters such as $CO_2$ production from the fish and any heterotroph bacteria in the filters, hydrogen production from the nitrification in the biofilters, and hydroxide production for a possible denitrification in the biofilters. For the pH regulation a base is added to increase the water pH and/or increase a buffer capacity of the water.

In some embodiments a lime solution (such as $Ca(OH)_2$ [Calcium Hydroxide] is added to the water flow. The $Ca(OH)_2$ is added by the lime dosing unit 114, which is controlled by signals generated by a pH sensor 134.

Temperature regulation within the RAS can be accomplished based on various factors such as temperature of the surroundings (summer/winter), amount of replacement water added to the system, temperature of the replacement water, degree of insulation of the whole system, and total energy use in the system, as well as any combinations thereof. A temperature in the RAS is monitored by a temperature sensor 136 placed in the first reservoir. The temperature sensor 136 is connected to the controller and depending on a set point temperature and the actual temperature in the system, the controller can open a motor valve and a circulation pump brings cold or warm water to a cooling spiral established in the second reservoir to regulate stabilize the water temperature (e.g., bring within a safe operating temperature range).

As mentioned above, the RAS products include sludge water from cleaning operations of RAS components. Discharge from a re-circulated fish farm comes from three RAS components: (1) process water from the fish tanks; (2) sludge water created from cleaning of the mechanical filters; and (3) sludge water originating from cleaning of the biological filters.

To compensate for the discharge/removal of sludge water, replacement water is added in the first reservoir 112. The exchange of process water out of the RAS is controlled by a discharge water pump 138 (also referenced as discharge pump 138). This discharge water pump 138 is controlled by the controller so it is possible to get a specific volume of discharged water by programming the controller with specific discharge parameters.

The discharge water pump 138 can be coupled with a wastewater injection system 140 that injects discharge water back into the saline aquifer.

In addition to the exchange of process water, the adding of replacement water is also controlled by a level sensor measuring a water level inside the first reservoir 112. When the water level decreased below the specified level, the controller 108 causes a motor valve to open and at the same time an inductive flow sensor measures the amount of replacement water which is added to the RAS.

The discharge pump 138 can be coupled with a wastewater injection system 140 that injects discharge water back into the saline aquifer.

Figure 1B:
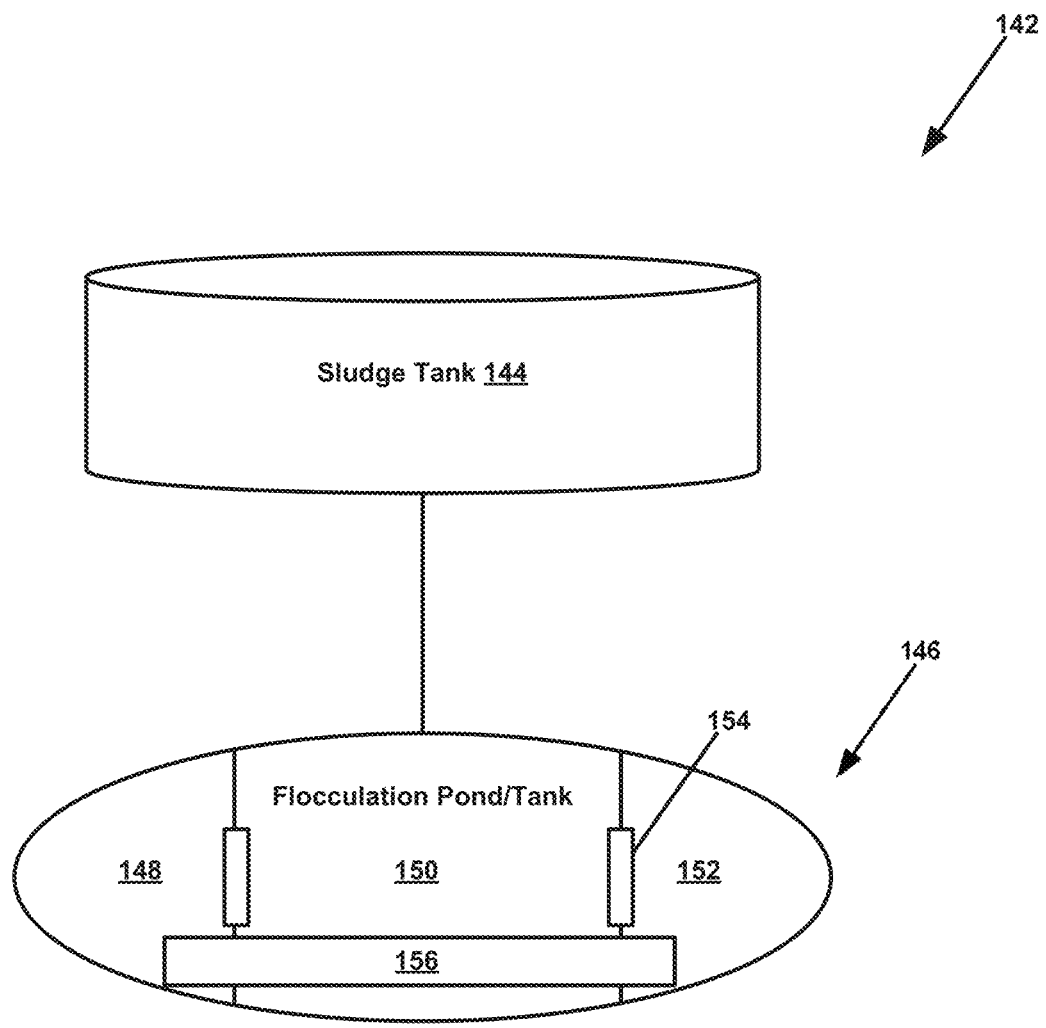
FIG. 1B is a schematic view of a sludge processing system for use with the system of FIG. 1A

Referring now to FIG. 1B, with respect to sludge water, the production of sludge from one kilogram of feed depends on different factors such as fish species and fish size, and feed conversion rate (FCR). Quality of fish feed also affects sludge production such as physical quality (dust), composition (oil, nitrogen, phosphor, carbohydrate), raw materials (animal, blood meal, vegetables, and so forth), digestibility (dissolved and un-dissolved waste, amount of excrements), excrements (consistency), and production methods (extruded pellets, pelleted pellets)—just to name a few.

Feed management can also affect sludge production such as feeding strategy, feeding levels, feed waste, sludge age, whether the sludge has been thickened, how long the sludge has been stored and so forth.

Sludge production from a RAS originates from cleaning of mechanical filters. For example, the amount of sludge water originating from the mechanical filters is approximately 150-200 l/kg feed. The dry matter (DM) of the water is varying from 350-700 mg SS DM/L, as an average 500 mg SS DM/L equals to 100 g DM/kg feed.

The fixed bed filters can be cleaned/back flushed every four to six weeks because of sludge inside the biological filter will create bacterial growth and capture of fine particles. The amount of water originating from the back flushing of the biological filters depends on the interval of flushing. The dry matter of the sludge originating from the biological filters is approximately 0.3% DM. The production of sludge in the biological filters is in average 50 g DM/kg feed.

A total production of sludge is approximately 150 g DM/kg feed. In order to reduce the discharge of sludge from a fish farm, the sludge can be concentrated to approximately 2-3% DM by use of coagulants and removal of the water by use of a belt filter. The following coagulants can be utilized: (a) ferri-chloride ($FeCl_3$)—phosphor dependent; (b) aluminum-sulfate ($AlSO_4$)—phosphor dependent (be aware of accumulation of aluminum in the RAS).

When working with phosphor removal it will be understood that phosphor is mainly bound to particles. Thus, phosphor removal can depend on coagulation and flocculation where fine particles (less than one μm) are captured in larger sludge particles.

Dosing of ferri-chloride ($FeCl_3$) can be accomplished using 1.4 mol iron per mol of diluted phosphor which require removal. In practice the following has been observed: (a) eel farm: 10 mg $PO_4^{3-}$/l to 1.5 mg $PO_4^{3-}$/l: 75 ml/m$^3$ of water; (b) trout farm: 9 mg $PO_4^{3-}$/l to 0.3 mg $PO_4^{3-}$/l: 120 ml/m$^3$ of water; (c) other fish species: approximately 1 ml 13% $FeCl_3$ per liter of sludge produced.

After addition of the chemical it is important to achieve good sweep coagulation in order to form flocks that can subsequently be easily separated from the water. The flocculation process requires an energy input in order to be able to create collisions between the growing metal hydroxides and the destabilized colloidal pollutants.

Mixing occurs adjacent to the flocculation ponds in the form of three separate tanks connected in series. Retention time for the entire flocculation phase, spread over the tanks, is 15-20 minutes.

Gate-type agitators are used which provide about 80% unrestricted area. A peripheral velocity of about 0.5 m/s is recommended in the first flocculation tank. This speed should be reduced gradually to 0.3 m/s in tank two and to about 0.1 m/s in the last tank. These tanks can be shaped as squares. An optimal relation between agitator diameter and width of the tank is 0.8, in some embodiments.

The mixing speed created by different agitators can be individually checked to ensure optimum results. Some of the many factors that can influence the required agitation rate are water quality, chemical dose rate, temperature, and retention time.

It is noteworthy that the water leaving the flocculation process is not subjected to greater forces than those encountered in the tanks. The flocculation tanks can be located directly adjacent to a separation stage and the water velocity when entering the belt filter can be established as being no higher than 0.1 m/s. The speed of the belt is selectively adjustable from 1-15 m/minute.

In one embodiment, concentrating sludge to a DM of 4-5% can be achieved by the use of coagulants and in addition adding a polymer to the sludge water before passing the sludge to a belt filter.

In practice the following has been observed by dosing polymer: (a) 1 g polymer/kg feed equal to approx. 5 g/kg DM; and (b) approximately 2 ml 0.1% solution of polymer per liter of sludge produced can be utilized.

Sludge water from the mechanical and biological filters is collected in a sludge tank 144. From the sludge tank 144 the sludge water is pumped to a first flocculation pond/tank 146. In one embodiment, the first flocculation tank comprises three separated chambers connected in series 148, 150, and 152. In a first flocculation tank, ferri-chloride ($FeCl_3$) and polymer is added and pH is adjusted. In order to achieve good flocculation gate agitators are connected in each chamber, such as gate agitator 154.

Retention time for the entire flocculation phase, spread over the tanks, is 15-20 minutes. When the sludge water passes the flocculation chambers, sludge particles are growing and when leaving the chambers the sludge particles are separated from the water by passing a belt filter 156. Sludge is drained on the belt and scraped off at the top of the belt. A jet washing system can be used to clean the belt by high pressure water.

The sludge pump, gate agitators, and belt filter are operated at the same time, controlled by water level inside the tank of the belt filter. In addition, the belt filter is operated by a frequency converter to adjust speed of belt.

The clean water can be spray irrigated on surrounded areas or discharged to a river, the sea, or into portions of an aquifer as described above. The sludge can be stored in a storage tank and used as a fertilizer in other embodiments.

As mentioned above, the systems and methods of the present disclosure involve using a saline aquifer to source and/or dispose of water used in an RAS. In one embodiment a Floridan aquifer is utilized. The artesian aquifer is one of the world's most productive aquifers covering the entire state of Florida. The Floridan aquifer was created millions of years ago when Florida was underwater. Today the Floridan aquifer is a major source of fresh drinking water for many communities in Southern Florida. Utilizing naturally occurring filtration systems, fresh water is drawn from the upper layers, referred to as a first segment, while wastewater is injected deep into the 'boulder zone' of the aquifer, referred to as the second segment.

The water travels through miles of natural sand-filters before rising into a stream of fresh water. Like all sources of fresh water the wells have a highest level of biosecurity to avoid pollution and contamination.

The natural system of the Floridan aquifer delivers cold, purified waters through miles of sand-filers into Southern Florida from deep sea. Harvesting this cold, purified water and using the same within the RAS systems of the present disclosure allow for raising of Atlantic salmon efficiently even in a tropical zone.

Figure 2:
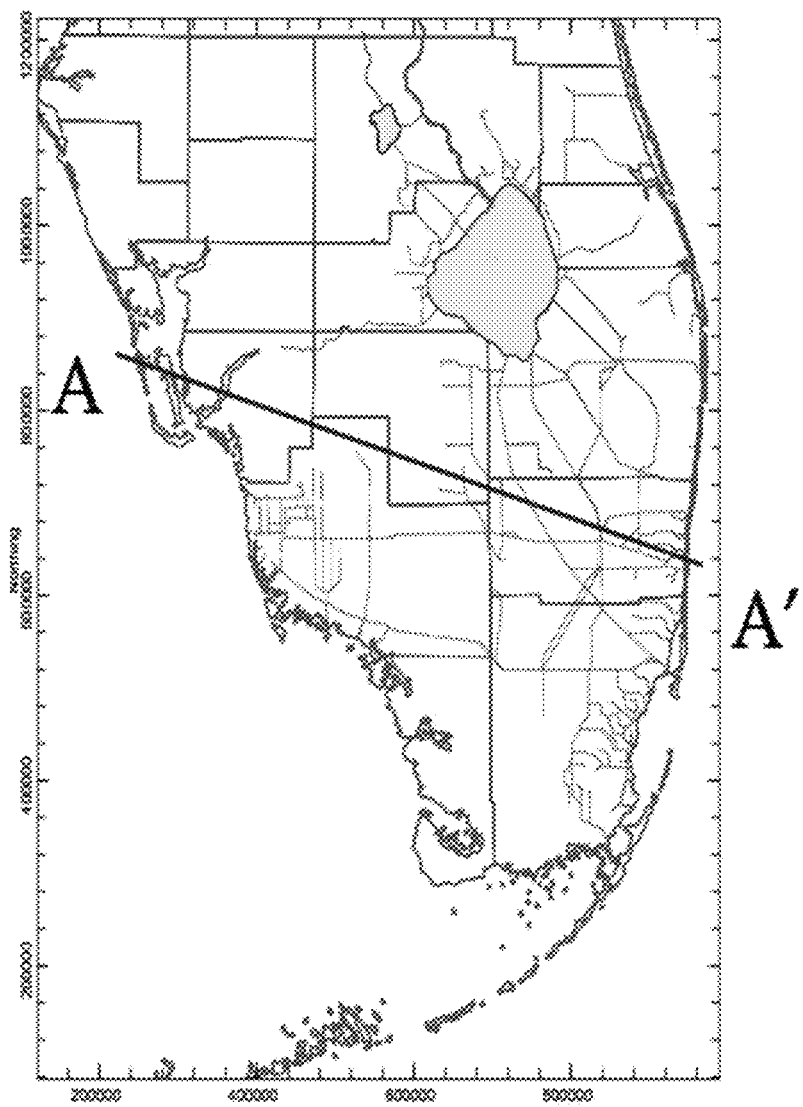
FIG. 2 illustrates a line of demarcation for a Floridan aquifer.
Figure 3:
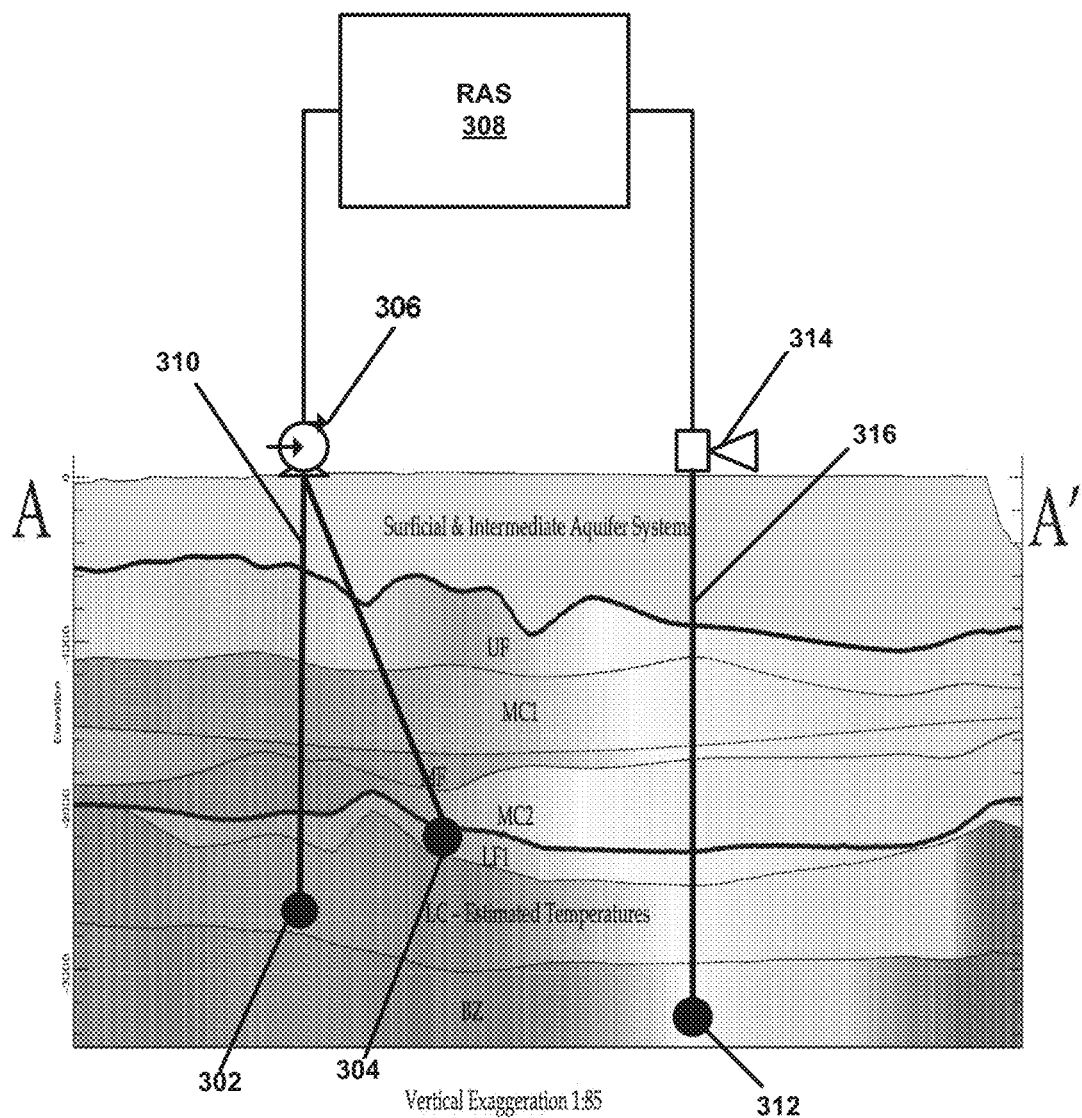
FIG. 3 is a cross sectional view of a stratification of the Floridan aquifer.

FIG. 2 illustrates a line of demarcation A-A' that is representative of a position of the Floridan aquifer. FIG. 3 illustrates cross section and stratification of segments of the Floridan aquifer taken along the line of demarcation A-A'. An example extraction point 302 in the LC segment is illustrated as well as an example extraction point 304 in the LF1 segment. A pump station 306 associate with an RAS 308 removes the water from either the extraction point 302 or the extraction point 304. The pump station 306 draws water through a drill string 310.

An injection point 312 is located within the BZ segment. Discharge water and/or sludge water is injected into BZ segment through the injection point 312 using a wastewater injection system 314 (see wastewater injection system 140 of FIG. 1A) that includes a pump string 316.

According to various exemplary embodiments, water may be sourced from the LC and/or LF1 segments and discharged into the BZ segments. According to various exemplary embodiments, above the UF level is acceptable for use as freshwater and drinking water. Between UF and MC2 is brackish water and water is used for desalination plants. Below MC2 there is pure saltwater.

A cold water zone is located in the South East of Florida. The South Eastern zone of Florida is heavily populated and contains many protected natural reserves.

The system and methods of the present technology allow for raising of various fish species, such as Atlantic salmon using various combinations of oxygenation, degassing, particulate removal, bio-filtering, sanitizing, flocculation, and denitrification. Denitrification is an optional step in some embodiments.

The following sections describe the use of the present disclosure to raise salmon with a yearly production of 30000 tons HOG of 4.5 to 5 kg gram fish.

The RAS facility includes 20 separate systems when eggs are bought from an external supplier. The system is designed to comprise two separate production lines to insure biosecurity, possibility of producing under different standards in each system, and possibility of using different genetics. The RAS facility can comprise two hatcheries, two start-feeding and Parr systems, two smolt systems, two post smolt facilities, and 14 ongrowing systems.

The specifications (amount of tanks, volumes, flows etc.) for the different systems are given in the Table 1 illustrated below. The total production of the facility is approximately 6,000 to 100,000 tons of 4.5 kg to 5 kg salmon per year. The production plan and the dimensioning of the facility are based upon an input of four batches per year. A total production cycle (end-weight 4.5 to 4 kg) will in average take 90 to 95 weeks after hatching with time scheduled for grading and other production stops.

The production is based on four batches of egg intake of late maturation fish. The fish will survive two winters so that the natural biological clock of fish will not get disordered and maturate early.

With respect to the hatchery, the fish enter as sizes of 0.18 to 0.2 grams and exit at 0.16 to 0.18 grams. The roe from the egg supplier will deliver 2,500,000 roe per batch and receive 4 batches per year, so around 10,000,000 roe per year. Roe are place in the hatchery and hatched. The hatchery includes of eight comphatch units and the hatching cabinets are easy to maintain and provide easy removal of the trays for eggs shells and dead eggs. The yolk sack is absorbed and the when the fingerlings are ready they will be moved to the fry for start feeding. A mortality rate of 7% is calculated during the hatching. For further information on the system see table 2.1

Start feeding tanks (size in 0.12 grams to 0.14 grams; size out three grams; and time in system up to 2.5 to three months). These feeding tanks comprise two 25Ø3 m tanks that are one meter deep. Ø3 m tanks are efficient to operate for start feeding. The fish are grown up to three grams in size and transferred and graded to the Parr tanks. When transferred they are graded a first time. The normal mortality will not be higher than 5% in the start feeding but by the first grade and culling of 10% of the slowest fish.

Parr tanks (size in 3 grams; size out 20 grams; time in system up to 2.5 to 3 months). Fish stay in the Parr tanks until they are 20 grams and then they are transferred to smolt tanks. In this stage mortality is very low 5%. The fish are graded in this transfer as well. Smolt tanks (size in 20 g; size out 70 g; time in system up to 3 months). In the smolt system salinity will be brackish and they will remain therein through winter. Then when the fish reach 70 grams they are transferred to the post smolt system.

Post Smolt tanks (size in 70 g; size out 200 g; time in system up to 3 to 5 months). In the post smolt system the salinity will be brackish (around 12 ppt) to keep the fish in the smolt stage. The system has three sizes of tanks, in some embodiments. Then at 200 to 300 grams in size, the fish are transferred to the ongrowing systems. These post smolt tanks are design to be able to produce 350 g fish to have buffer in the system production delays or increased production later.

On-growing systems (size in 200 g; size out 5250 g; time in system up to 12 months). The fish can be held in Ø25 tanks for up to 32 weeks. The final weight in the Ø25 m tanks is 1.9 kg. This process should take six months so as to leave an extra buffer in the production system. The fish will be graded upon transfer and split in three sizes and the smallest are culled. The fish will have a second winter in this system in six weeks before being transferred to the Ø31 m tanks. The fish can be held in Ø31 tanks up to 24 weeks. The final weight in the Ø31 m tanks is 5.25 kg.

Ø16 m tanks (size in 5250 g; size out 5250 g; time in system 2 to 3 weeks). These tanks are operated on flow through to remove any potential off-flavour from the fish. The fish from the Ø27 m tanks are split in three groups with grading and small fish being returned to tanks with equal size of fish. One tank is maintained to remove off flavour for two weeks (one week minimal feeding). So the system includes of nine Ø18 m tanks.

The below data in Table 1 describes the dimensioning criteria used in dimensioning of the RAS facility. This describes half of the facility.

TABLE 1

| Systems Fish tank | | Hatchery | Fry and Par | Smolt | | Post Smolt | On growing | | Harvest* |
|---|---|---|---|---|---|---|---|---|---|
| diameter (Ø) | | | Ø 3 m | Ø 5 m | Ø 8 m | Ø 10 m | Ø 13 m | Ø 25 m | Ø 31 m | Ø 18 m |
| Temperature | °C. | 5-8 | 16 | 16 | 16 | 16 | 16 | 16 | 16 | 16 |
| Salinity | ‰ | 0 | 0 | 0 | 3-4 | 12 | 12 | 12 | 12 | 12 |
| Number of fish tanks | pc. | 4 | 25 | 14 | 9 | 9 | 9 | 8 | 16 | 9 |
| Fish tank diameter (Ø) | m | — | 3 | 5 | 8 | 10 | 13 | 25 | 31 | 18 |
| Water level | m | — | 1 | 2.8 | 3.2 | 4 | 10.5 | 10.5 | 10.5 | |
| Fish tank height | m | — | 1.2 | 1.8 | 3.3 | 4 | 5 | 11 | 11 | 11 |
| Fish tank volume | m³ | — | 7.1 | 32 | 140 | 250 | 530 | 5150 | 7920 | |
| Total fish tank volume | m³ | — | 178 | 448 | 1.260 | 2.250 | 4.770 | 41.200 | | |
| Water flow per fish tank | m³/h | 14.4 | 21 | 80 | 280 | 500 | 800 | 7700 | | |
| Total water flow to fish tanks | m³/h | 14.4 | 525 | 1.120 | 2.520 | 4.500 | 7200 | 61600 | | 7800** |
| Water exchange in fish tanks | times/h | — | 3 | 2.5 | 2 | 2 | 1.5 | 1.3 | 1.3 | 1.0 |
| Retention time in fish tanks | min. | — | 20 | 24 | 30 | 30 | 40 | 45 | 45 | |
| Biomass (max.) | kg | — | 3.560 | 22.400 | 126.000 | 292.500 | 468.000 | — | — | |
| Fish weight-start | g/pc. | — | 0.18 | 3 | 20 | 70 | 160 | | | |
| Fish weight-end (max) | g/pc. | — | 3 | 20 | 70 | 160 | 350 | | | |
| Densities (average max) | kg/m³ | — | 20 | 50 | 50 | 65 | 65 | 75 | 95 | 95 |
| Feeding rate (theoretical) | kg/day | — | 6 | 2.4 | 1.5 | | | — | 48.000 | No feeding |
| Biofilter capacity | Kg/day | — | 214 | 560 | 1890 | | 4000 | — | 48.000 | — |

*For all systems
**Is on flow through

Resource requirement of the systems depends on how intensive the systems are used. At full capacity at all levels the average operational consumptions are expected to be (1) water—the water exchange in the systems can be higher if the water is also used for cooling of process water. (b) electricity—the electrical energy consumption installed is estimated to 16,000 kW. If all equipment is desired to run in case of power failure it is advisable to install an emergency generator; (c) oxygen—the amount of oxygen added to the water depends on several factors. The supply of oxygen to the system can be done by a Cryo tank or by an oxygen generator. Oxygen backup for emergency events is located onsite. At max feeding capacity, the daily oxygen consumption will be approximately 0.5 kg $O_2$/kg feed. Oxygen 50,000 kg/day; (d) lime dosing of lime $(Ca(OH)_2)$ for regulation of pH depends on several parameters. Estimated consumption is approximately 0.1 kg lime/kg feed equals 10,000 kg of lime per day; and (e) carbon source—the denitrification process needs a source of carbon and it will need around 10,000 kg day of methanol.

Figure 4:
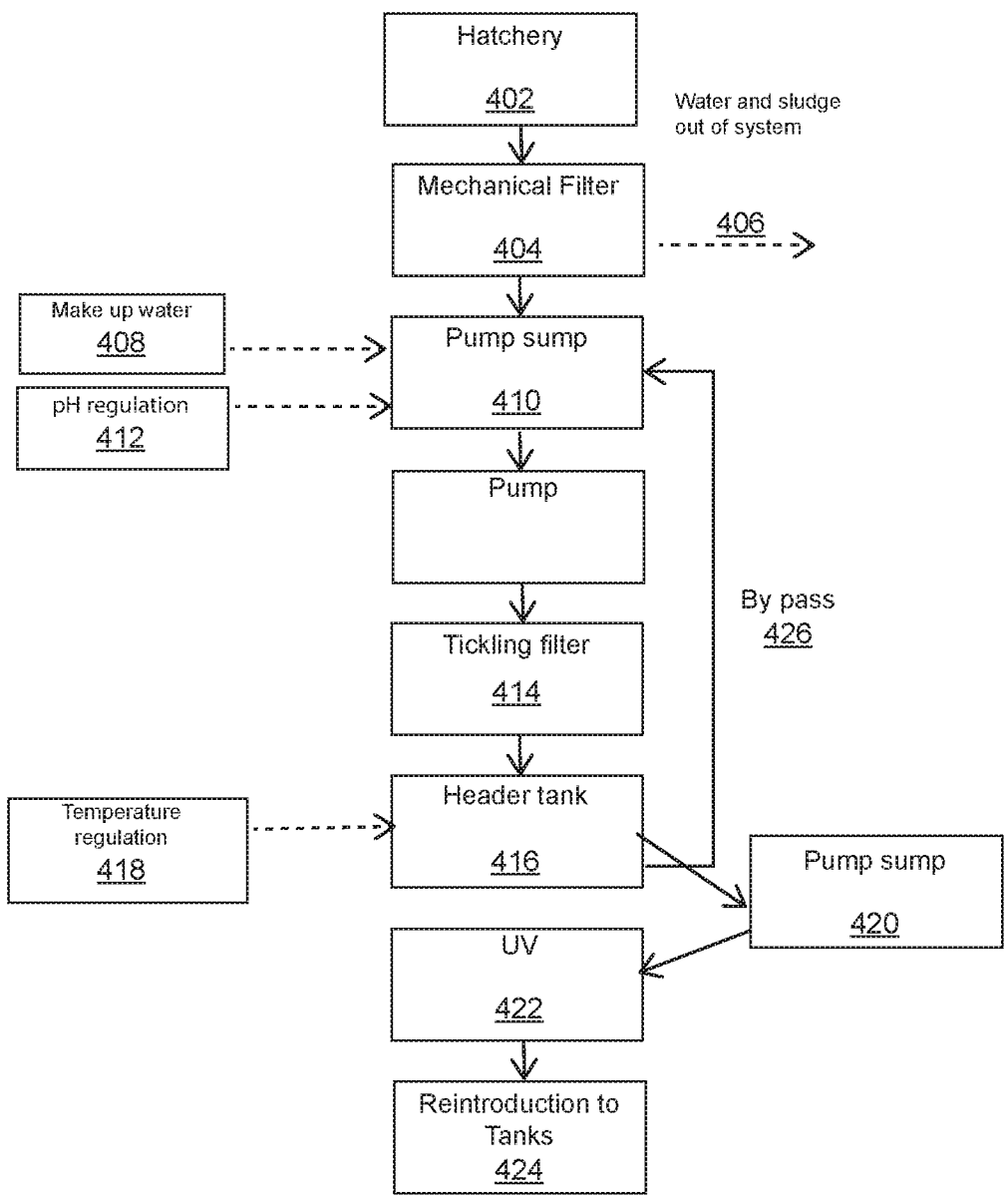
FIG. 4 is a flowchart of an example method of the present disclosure.

FIG. 4 is a flowchart of an example process for using an RAS of the present disclosure. In one embodiment the method includes a step 402 of operating hatchery tanks associated with a RAS. The water flow from fish tanks in the hatchery is directed to a mechanical filter in step 404. Sludge water produced by cleaning the mechanical filters is directed out of the RAS in step 406. As mentioned above, the sludge water can be processed using a flocculation system.

In step 408 replacement water lost through the mechanical filter cleaning process is introduced using the sump pump 410 (also referenced as pump sump 410). Lime dosing can occur in step 412 and also occurs using the sump pump 410 of the first reservoir.

A pump delivers the water flow to a trickling filter in step 414 and then into a header tank in step 416. Temperature regulation of the water flow occurs in step 418, if necessary. A sump pump associated with a second reservoir is used to transfer the water flow in step 420 prior to disinfecting of the water flow in step 422. Again, the step 422 of disinfecting is an optional step. The water flow is re-introduced to the operating of the hatchery tanks in step 424.

The method can include an optional bypass step 426 that is used to return temperature controlled water back into the first reservoir.

Figure 5:
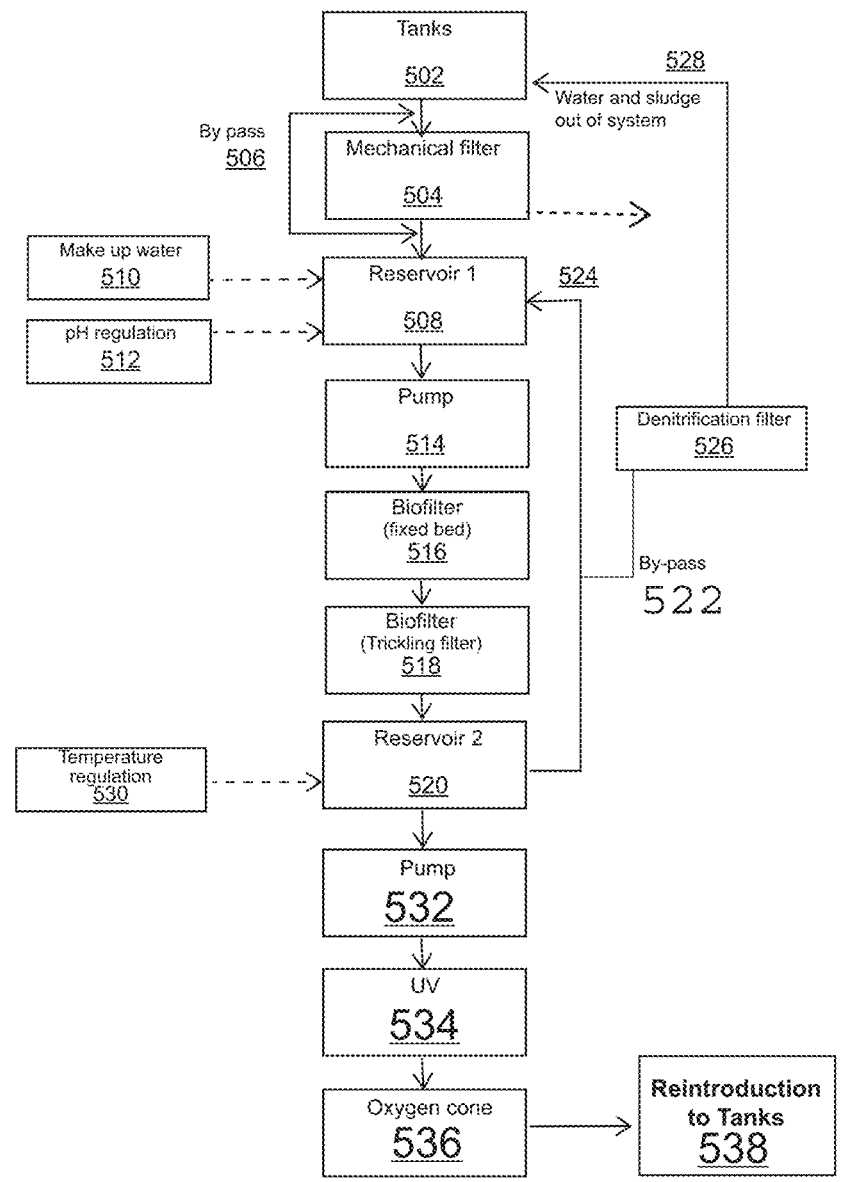
FIG. 5 is a flowchart of another example method of the present disclosure for operation of RASs of the present disclosure.

FIG. 5 is a flowchart of a method for start feeding and use of a Parr system. In step 502 a plurality of tanks are operated. The tanks include fish that produce waste and create discharge water. The method includes transferring water from the tanks to a mechanical filtering system in step 504. An optional bypass step 506 circumvents the mechanical filters in the event of a failure of the mechanical filters, maintaining water flow through the RAS.

The water is then delivered to a first reservoir in step 508 where replacement water is added in step 510 and pH regulation through lime dosing occurs in step 512. The water is then pumped in step 514 from the first reservoir to a fixed bed biofilter in step 516. The water is then passed through a trickling biofilter in step 518 and on to a second reservoir in step 520.

An optional bypass step 522 diverts a portion of the water flow into the first reservoir in step 524 and/or to a denitrification filter 526 in step 528 prior to re-introduction into the tanks.

In one embodiment water in the second reservoir is temperature regulated in step 530 and then pumped in step 532 through a disinfecting UV apparatus in step 534. The process also includes passing the water flow through oxygen cones in step 536 prior to re-introduction of the water back into the tanks in step 538.

Figure 6:
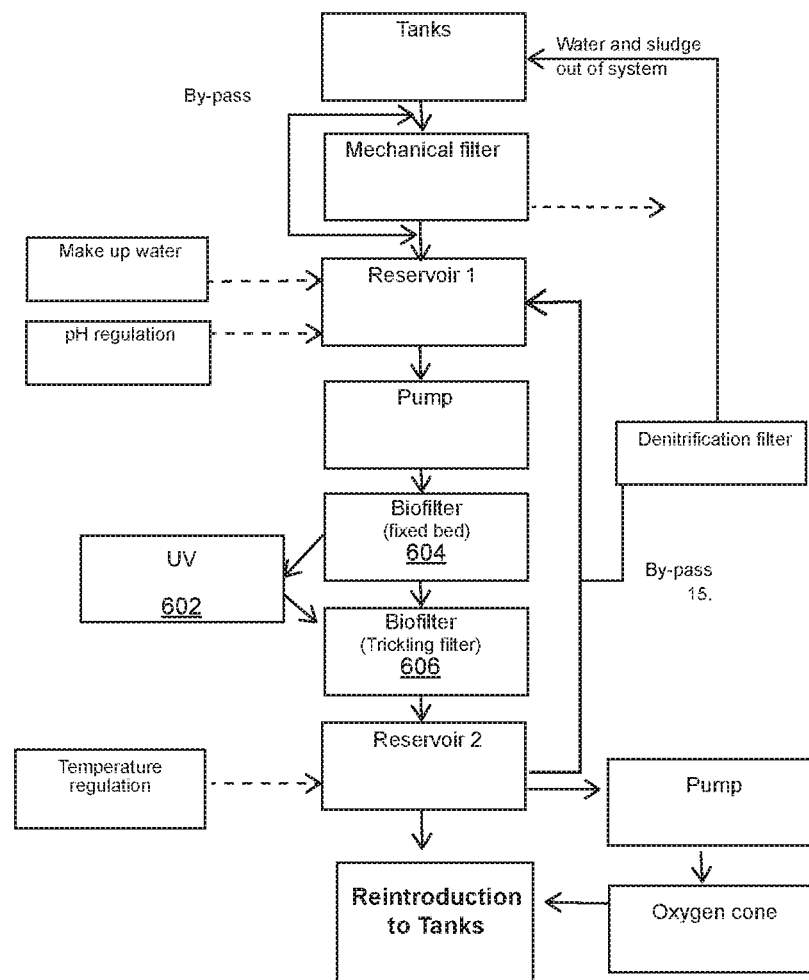
FIG. 6 is a flowchart of yet another example method of the present disclosure for operation of RASs of the present disclosure.

FIG. 6 is a flow diagram of a smolt and post smolt system operation. This process is largely similar to the process illustrated in FIG. 5 with the exception that a UV disinfecting apparatus is utilized in step 602, between a fixed bed biofilter and trickling filter processing steps 604 and 606.

Figure 7:
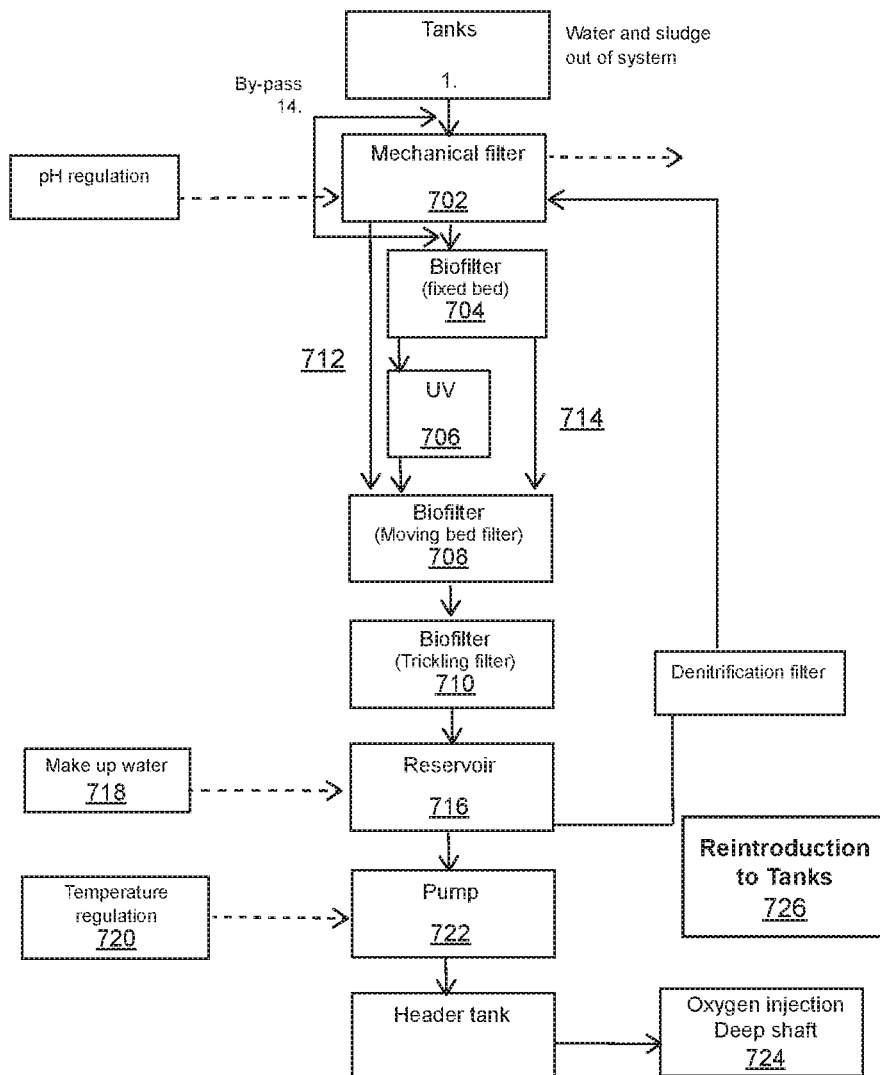
FIG. 7 is a flowchart of an additional example method of the present disclosure for operation of RASs of the present disclosure.

FIG. 7 illustrates an example method for ongrowing of fish in the RAS. The method includes a step of directing water flow in fish tanks through a mechanical filter in step 702, a fixed bed biofilter in step 704, through an inline UV disinfecting apparatus in step 706, into a moving bed filter in step 708, and then to a trickling filter in step 710. In one embodiment, the mechanical filter can be configured to divert water flow directly to the moving bed biofilter in step 712. The UV disinfecting apparatus can also be bypassed in step 714.

Water is directed into a reservoir in step 716 where replacement water is added into step 718. The water is pumped to a header tank after temperature regulation in steps 720 and 722. Oxygen injection using deep shaft processes occurs in step 724 prior to re-introducing the water into the fish tanks in step 726.

An optional step of denitrification can occur between the process of adding replacement water and subsequent mechanical filtering.

Figure 8:
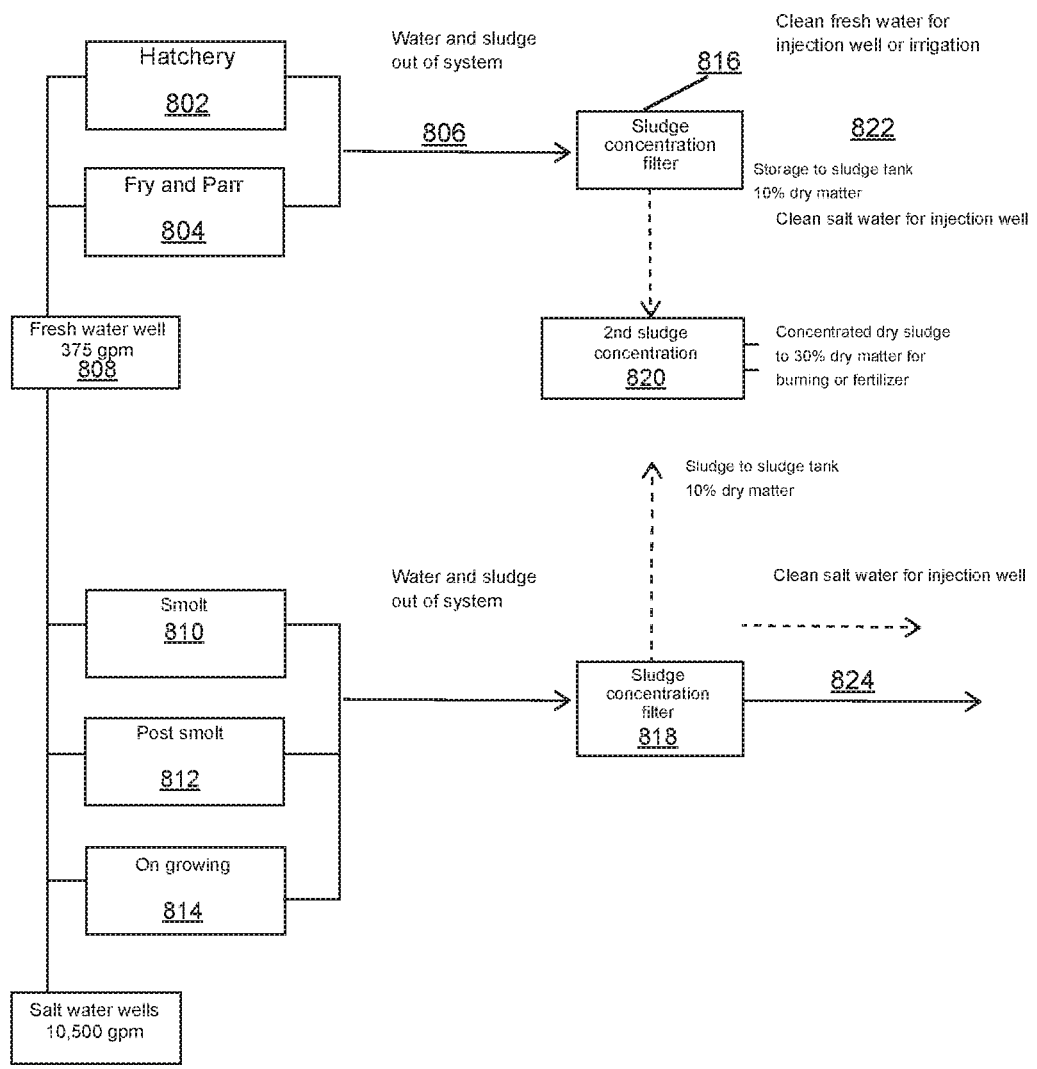
FIG. 8 is a flowchart of an example method of the present disclosure for processing sludge water produced by a RAS.

FIG. 8 is a flow diagram of an example fish rearing process using a hatchery and RAS described above. Fish from egg stage are maintained in a hatchery in step 802 and then transitioned into a fry and Parr system in step 804. During this process the RAS is operated and produces sludge water from cleaning of mechanical filters. Discharge water and sludge are transferred out of the RAS into sludge processing system in step 806. In step 808, replacement water is added to the water flow. Smolt tanks are operated in step 810. Fish are transferred to the post smolt tanks in step 812 and then into ongrowing tanks in step 814. At each of these steps discharge water and sludge are produced and transferred out of the RAS.

Salt water from saline aquifer can be obtained at any point during operation of the system, at a specified rate, such as 10,500 gallons per minute.

The sludge is processed by passing the sludge water through a sludge concentration filter in steps 816 or 818. Once concentrated, the sludge is processed in a second concentration step 820. Sludge that is subject to the second concentration step can be used for combustion or fertilizer. Water removed from the sludge in steps 816 or 818 is cleaned prior to injection into the saline aquifer in step 822 or 824.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, device, assembly, sub-assembly, component, and combinations thereof. Alternatively, in some embodiments the "means for" is expressed in terms of prose, or as a flow chart or a diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "mechanically connected," etc., are used interchangeably herein to generally refer to the condition of being mechanically or physically connected. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system for culturing aquatic life comprising:
   a pump station structured to draw water through a drill string;
   said drill string comprising an extraction point tapped within a first segment of a saline aquifer;
   a recirculating aquaculture system structured to receive water from said pump station;
   said recirculating aquaculture system structured at least to produce discharge water;
   a wastewater injection system structured to receive and dispose of discharge water produced by the recirculating aquaculture system;
   said wastewater injection system comprising a pump string and an injection point, and
   said injection point structured to inject discharge water into and embedded within a second segment of the saline aquifer, the second segment of the saline aquifer being a predetermined distance below the first segment of the saline aquifer.

2. The system according to claim 1, wherein said extraction point is tapped with the first segment of a Floridan aquifer;
   the first segment of the saline aquifer having water comprising a salinity of at least five parts per thousand and the first segment of the saline aquifer comprising any of a lower confining segment (LC segment) or a lower Floridan producing zone one segment (LF1 segment); and
   the second segment of the saline aquifer comprising a boulder zone segment (BZ segment) of the Floridan aquifer.

3. The system according to claim 2, wherein the water drawn through the drill string sourced from the LC segment has a salinity of approximately five to thirty parts per thousand.

4. The system according to claim 2, wherein the water drawn through the drill string sourced from the LC segment has a temperature of 40 to 85 degrees Fahrenheit within the recirculating aquaculture system.

5. The system according to claim 1, wherein the recirculating aquaculture system further comprises:

a tank structured to contain water and fish;
a mechanical filter disposed in material communication with the water contained in said tank and biological waste produced by the fish;
said mechanical filter structured to remove solid portions of the biological waste;
a first reservoir, disposed in operative orientation with a lime dosing unit;
said lime dosing unit disposed in material transferring communication with said first reservoir structured to introduce lime into the water to regulate a pH level of the water in the first reservoir;
a biological filter structured to receive mechanically filtered water;
a moving bed biological filter disposed in fluid communication with said biological filter, structured to convert organic matter into carbon dioxide and ammonia into nitrogen;
a degasser structured to receive water from said biological filter and remove the carbon dioxide, the nitrogen, or other undesired gases; and
a second reservoir structured to regulate a temperature of the water.

6. The system according to claim 5, further comprising at least one oxygen cone in fluid communication with at least said second reservoir structured to at least add oxygen to a portion of said temperature regulated water.

7. The system according to claim 5, further comprising an ultraviolet (UV) filter in fluid communication with at least said second reservoir structured to dose a portion of said temperature regulated water with UV radiation.

8. The system according to claim 5, further comprising at least one pH control system, a level sensor disposed inside said first reservoir, and a temperature sensor disposed in fluid communication with said first reservoir, and any combinations thereof.

9. The system according to claim 5, further comprising an emergency oxygen system structured to introduce oxygen directly into said tank via at least one emergency oxygen diffuser upon failure of an oxygenation system.

10. The system according to claim 1, wherein said pump and said drill string are collectively structured to draw water into said recirculating aquaculture system from the saline aquifer at a range of approximately 300 liters to 600 liters, inclusive, per kilogram of food introduced in to a tank for fish.

11. The system according to claim 5, further comprising a trickling filter disposed between said first reservoir and said second reservoir.

12. The system according to claim 5, further comprising:
a sludge tank disposed in receiving relation to sludge water from said mechanical filter and said biological filter; and
a flocculation tank disposed in receiving relation to said sludge water and a coagulating compound.

13. The system according to claim 12, wherein said flocculation tank comprises:
a plurality of tanks connected in series,
adjacent ones of said plurality of tanks disposed in fluid communicating relation with one another, via agitators; and
a belt filter disposed in sludge removing relation to said flocculation tank.

14. The system according to claim 13, further comprising:
a sludge storage tank structured to store said sludge removed from said sludge water.

15. The system according to claim 1, further comprising at least one oxygen sensor in operative communication with at least one controller, said at least one controller in operative communication with at least one solenoid valve, collectively structured to add oxygen to said system.

16. The system according to claim 1, further comprising a monitoring system structured to monitor at least thermal failure and water pressure.

17. The system according to claim 5, further comprising a gravity feed disposed in fluid communication with said second reservoir and said tank, said gravity feed structured to re-introduce a first portion of said temperature regulated water from said second reservoir to said tank.

18. The system according to claim 5, further comprising a secondary pump structured to pump a second portion of said temperature regulated water from said second reservoir to at least one oxygen cone.

19. The system according to claim 8, further comprising said temperature sensor in operative communication with at least one controller, said at least one controller in operative communication with at least one motor valve and at least one circulation pump, collectively structured to bring liquid water to a cooling spiral disposed in said second reservoir.

20. The system according to claim 8, further comprising said level sensor disposed in operative communication with a motor valve and an inductive flow sensor cooperatively structured to control an amount of water added to the recirculating aquaculture system.

* * * * *